March 9, 1948.  L. PARKIN ET AL  2,437,477
MANUFACTURE OF ARTICLES FROM SHORT LENGTHS OF TUBES
Filed May 12, 1944  2 Sheets-Sheet 1
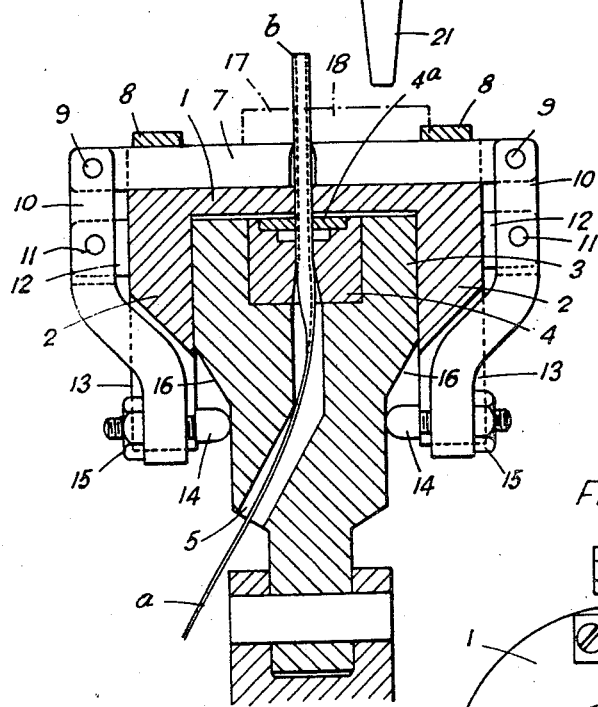
Inventors.
Leslie Parkin.
John Simpson.
by Walter P. Jones Atty.

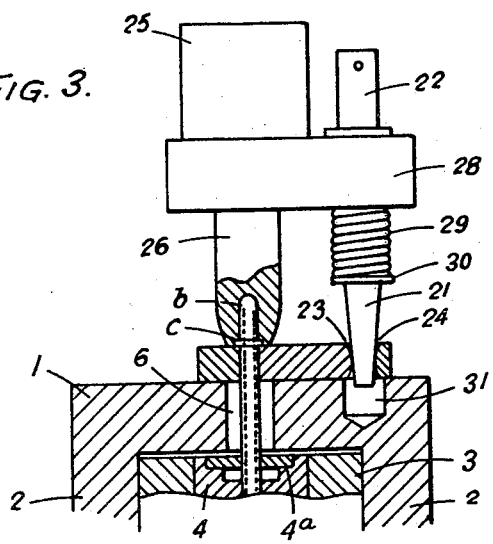
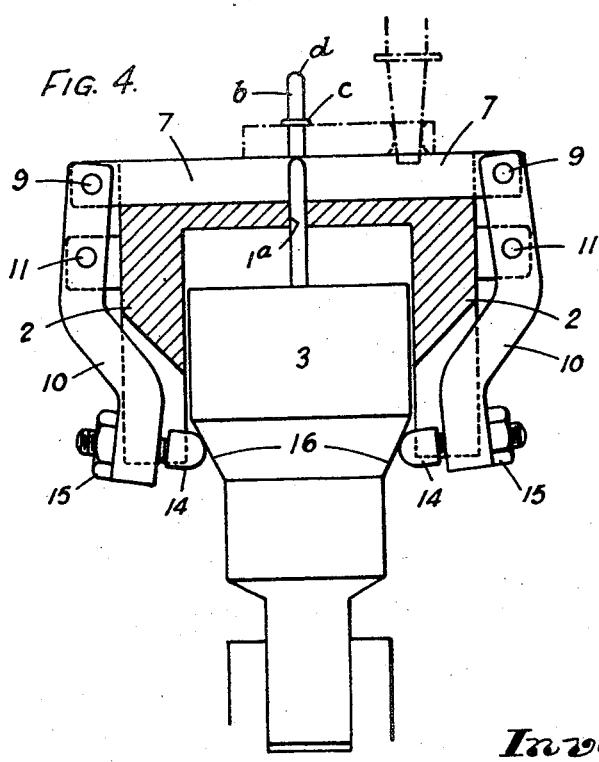

Patented Mar. 9, 1948

2,437,477

UNITED STATES PATENT OFFICE 2,437,477

MANUFACTURE OF ARTICLES FROM SHORT LENGTHS OF TUBES

Leslie Parkin and John Simpson, Nottingham, England

Application May 12, 1944, Serial No. 535,304
In Great Britain April 19, 1943

Section 1, Public Law 690, August 8, 1946
Patent expires April 19, 1963

1 Claim. (Cl. 113—119)

This invention relates to the manufacture of articles from short lengths of tube and particularly, but not exclusively, to the manufacture of tubular articles of comparatively small diameter adapted to form electrical contact pins for thermionic valves and other electrical devices.

Previously, tubular contact pins for thermionic valves have been manufactured from strip metal by cutting the blank transversely intermediate its side edges, the portion of the strip between transverse cuts being shaped by a series of dies while still attached to the strip and being severed only in the final shaping operation. This method entails a considerable waste of metal. In a modification of this prior method, the shaped short lengths of tube were fed to a die and separately subjected to a sizing operation. It has also been proposed to form tubular pins from circular blanks which were subjected to a series of pressing operations to dish the blank and finally form a seamless tube.

It is an object of the present invention to provide an improved method of manufacturing tubular articles whereby they can be produced with speed, accuracy and without waste of metal.

According to the present invention a method for the continuous manufacture of articles made from short lengths of tube comprises the steps of intermittently feeding a strip of sheet metal through a die to draw the strip into a tubular formation, and during the interval between intermittent feeding movement, forming a collar at or adjacent to one end of the tube and then cutting off a portion of the tube at a predetermined distance from the collar. The invention is particularly adapted for the continuous manufacture of tubular articles of small diameter from comparatively heavy gauge sheet metal, for example, contact pins for thermionic valves or other electrical devices. It is essential for such pins to be of the same length and to have a substantially uniform cross-section, for example 0.093" with a tolerance as small as ±0.003". It is also important that the head or collar formed thereon be accurately shaped to a diameter of, for example, 0.125" to 0.130".

The method may include forming the strip into a tube by a reciprocating die which also serves to feed the formed tube to apparatus for forming the collar.

The invention also includes apparatus for carrying out the above method.

To enable the invention to be fully understood it will now be described with reference to the accompanying drawings, in which:

Fig. 1 is a side elevation, partly in section, of one form of apparatus for producing electrical contact pins for thermionic valves or other electrical devices.

Fig. 2 is a plan of the gripping and cutting means.

Fig. 3 is a side elevation, partly in section, on line 3—3 of Fig. 2 shewing the grippers actuated to engage the formed tube, the cutters being omitted, and Fig. 4 is a side elevation, partly in section, shewing the cutters in cutting position.

As shewn in the drawings the apparatus comprises a base I having depending walls 2 forming guides for a reciprocating plunger 3 provided with a die block 4 having a tapering bore and die plate 4a and a channel 5 for the strip a which is to be formed into a tube by passing through the dies. The upper face of the base I has front radial slots 6 machined therein to receive cutters 7 which are slidably guided by straps 8. The outer ends of the cutters 7 are pivoted at 9 to levers 10 which are pivoted at 11 to brackets 12 attached to the walls 2. The free or lower ends of the levers 10 are bent inwardly through recesses 13 in the walls 2 and are each provided with a stud 14 which is adjustable relative to the lever and secured by a lock nut 15. The levers 10 are adapted to be actuated by cam faces 16 on the plunger 3 engaging the studs 14.

Immediately above the cutters 7 there is provided gripping means in the form of a frame 17 and a sliding block 18 each formed with opposed gripping jaws 19, 20 the two members being moved toward one another by the tapered end 21 of a pin 22 adapted to be forced between the adjacent faces 23, 24. A suitable spring or like means (not shewn) is provided for separating the jaws upon withdrawal of the pin 22.

A ram 25 is arranged above the base I and carries a tool 26 which has a recess 27 to receive the formed tube b and press it to provide a head or collar c thereon. The ram 25 is provided with an offset plate 28 which is apertured to receive the pin 22. The pin has a tapered lower end 21 and is normally urged downwardly by a spring 29 which abuts a shoulder 30 on the pin and the underface of the plate 28. The base I is recessed at 31 to receive the pin.

The plunger 3 and ram 25 are operated in timed relation, from a common crankshaft, by cams or other suitable means.

In operation the flat strip a, the width of which is equal to the circumference of the tubular contact pins to be provided, is fed into the passage 5. The free end of the strip is preformed by any suitable means into tubular formation to permit it being threaded through the dies 4, 4a, the aperture 1a in the base and between the cutters and gripper jaws.

The cycle of operations will be described starting from the position of the apparatus shewn in Fig. 1 wherein the portion of formed tube b extending from the underface of the grippers 17, 18 is just sufficient to produce a contact pin. The ram 25 descends from the position in Fig. 1 to that shewn in Fig. 3, and as it descends the tapered end 21 of the pin 22 engages between the faces 23, 24 to force the jaws 19, 20 to grip the tube b while the tool 26 is forced over it to form the collar c and also to form a domed end d. It will be noted that the spring mounting of the pin 22 permits the descent of the ram 25 after the pin has actuated the gripping means.

The ram 25 is raised to clear the formed tube, but while the tube is still gripped by the jaws 19, 20 the plunger 3 is lowered to the position shewn in Fig. 4, thereby forcing the die block 4 and die plate 4a over the strip a to form a further length of close seamed tube. The die block may be formed with a crescent or like shaped lower end to form a lead for the flat strip. During the descent of the plunger 3 the cam faces 16 engage the studs 14 and rock the lever 10 about its pivot 11 and force the cutters 7 inwardly to cut off the formed contact pin from the strip. In timed relation to this cutting action, the pin 21 is raised out of engagement with the gripping means, the jaws of which are separated automatically.

The plunger 3 then rises, and feeds the newly formed tubular portion through the aperture 1a and between the cutters which are withdrawn, by spring means, (not shewn) as the plunger rises, and between the separated gripping jaws 19, 20 the end of the strip ejecting the formed contact pin. The stroke of the plunger 3 is so arranged that each feeding movement presents sufficient formed tube to produce a contact pin. The parts of the apparatus are then in the position shewn in Fig. 1 and the cycle of operations recommences.

The thickness of the gripping jaws 19, 20 is equal to the length of the contact pin which is to extend below the collar c and as the cutters are arranged immediately below the gripping jaws, the contact pins will be formed to a standard size within very close tolerances. Although the apparatus is described as forming the collar c spaced from the end of the contact pin, it may be formed on the end.

Instead of parts of the apparatus being interconnected, the die plunger 3, cutters, gripping means and tool carrying ram may be adapted to be independently operated in timed relation.

Further, the apparatus and sequence of operations may be varied, if desired, without departing from the invention.

We claim:

The method of forming tubular sheet metal contact pins and the like comprising the steps of applying gripping means to a tubular end portion of a continuous strip of metal, moving a shaping tool axially over the free end thereof to form a dome-shaped end and a collar on said tubular end portion, relatively moving said strip and a shaping die to form an additional length of tubing on said strip, cutting the shaped end portion of the tube from the formed strip, releasing the shaped end portion from the gripping means and feeding a predetermined length of formed strip forward through the gripping means.

LESLIE PARKIN.
JOHN SIMPSON.

REFERENCES CITED

The following references are of record in the file of this patent:

UNITED STATES PATENTS

| Number | Name | Date |
|---|---|---|
| 137,992 | Wilmot | Apr. 15, 1873 |
| 1,087,876 | Goodridge | Feb. 17, 1914 |
| 1,878,640 | Miner | Sept. 20, 1932 |
| 2,007,149 | Dreyer | July 2, 1935 |
| 2,324,177 | Smith | July 13, 1943 |
| 2,326,660 | Kosha | Aug. 10, 1943 |